United States Patent [19]

Webb

[11] 4,353,521

[45] Oct. 12, 1982

[54] ANTI-THEFT DEVICE

[76] Inventor: Audivee Webb, P.O. Box 143, Fort Morgan, Colo. 80701

[21] Appl. No.: 198,301

[22] Filed: Oct. 20, 1980

[51] Int. Cl.³ ........................ E05B 73/00; F16B 41/00; F16M 7/00; F16M 13/00

[52] U.S. Cl. ........................................ 248/552; 70/58; 70/164; 70/170; 70/232; 70/DIG. 57; 70/158; 248/551

[58] Field of Search ........................ 248/552, 553, 551; 70/58, 57, 232, 158, 164, 163, 166, 167, 170, 171, DIG. 57, 168, 169, DIG. 58, 172–174, 229, 230, 258, 259

[56] References Cited

U.S. PATENT DOCUMENTS

| | | | |
|---|---|---|---|
| 1,279,509 | 9/1918 | Burks et al. | 70/232 X |
| 2,103,989 | 12/1937 | Machinist | 70/DIG. 57 |
| 2,461,676 | 2/1949 | Budak | 70/416 |
| 2,883,849 | 4/1959 | Lorenzo | 70/DIG. 57 |
| 3,284,121 | 11/1966 | Lyon | 70/DIG. 57 |
| 3,410,122 | 11/1968 | Moses | 70/58 |
| 3,595,041 | 7/1971 | Leeper | 70/232 |
| 3,665,739 | 5/1972 | Boll | 70/237 |
| 3,696,646 | 10/1972 | Loscalzo | 70/232 X |
| 3,768,284 | 10/1973 | Kent et al. | 70/DIG. 57 |
| 3,822,049 | 7/1974 | Saunders | 70/258 X |
| 3,824,815 | 7/1974 | Darling | 70/232 UX |
| 3,850,392 | 11/1974 | Gassaway | 70/232 X |
| 3,945,227 | 3/1976 | Reiland | 70/58 |
| 4,038,843 | 8/1977 | Daley, Jr. | 70/58 |
| 4,047,686 | 9/1977 | Porter | 248/552 |
| 4,058,994 | 11/1977 | Coppola | 70/232 |
| 4,079,604 | 3/1978 | Anderegg | 70/58 |
| 4,117,700 | 10/1978 | Saunders | 70/232 X |
| 4,228,974 | 10/1980 | Yates | 70/58 X |

FOREIGN PATENT DOCUMENTS

| | | | |
|---|---|---|---|
| 135412 | 4/1952 | Sweden | 70/232 |
| 338339 | 6/1921 | Fed. Rep. of Germany | 70/232 |
| 703011 | 4/1966 | Italy | 70/232 |
| 959271 | 5/1964 | United Kingdom | 70/DIG. 57 |

*Primary Examiner*—Ramon S. Britts
*Assistant Examiner*—Carl F. Pietruszka
*Attorney, Agent, or Firm*—James E. Pittenger

[57] ABSTRACT

An anti-theft device to prevent the unauthorized removal of a mounted, flanged object comprising a cover overlying the mounting flanges of the object, a securing device for attaching the cover to the surface upon which the flanged object is mounted and a locking device for preventing removal of the cover from the securing device. The invention is particularly useful in remote oil field and other field uses to prevent theft of industrial machine accessories such as starters, generators, and batteries.

5 Claims, 9 Drawing Figures

Fig_5
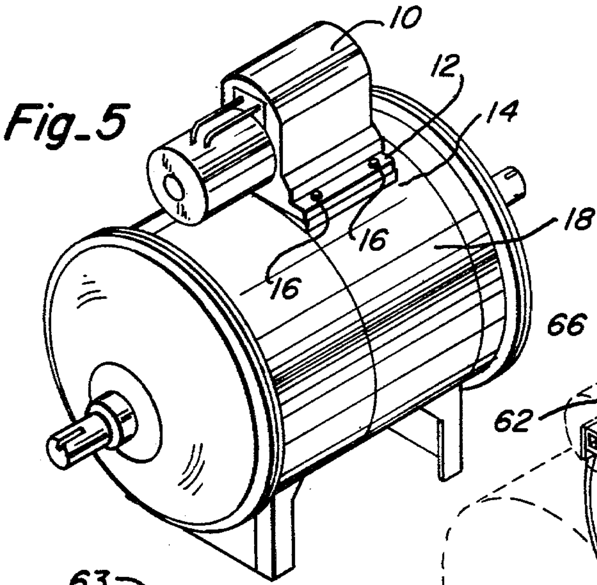
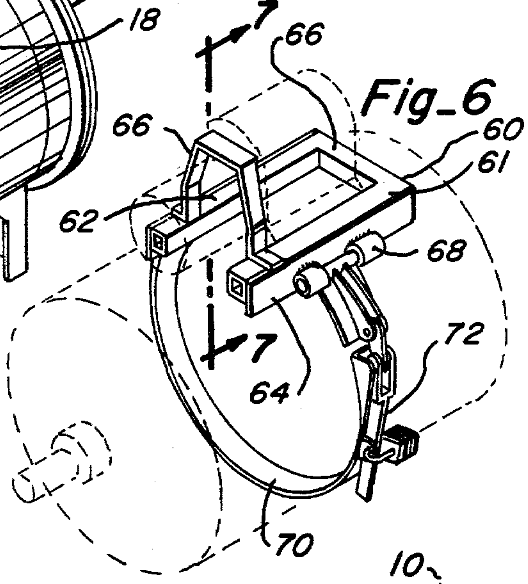
Fig_6
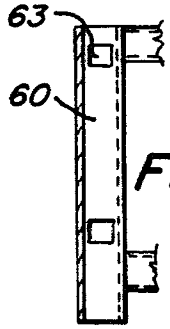
Fig_9
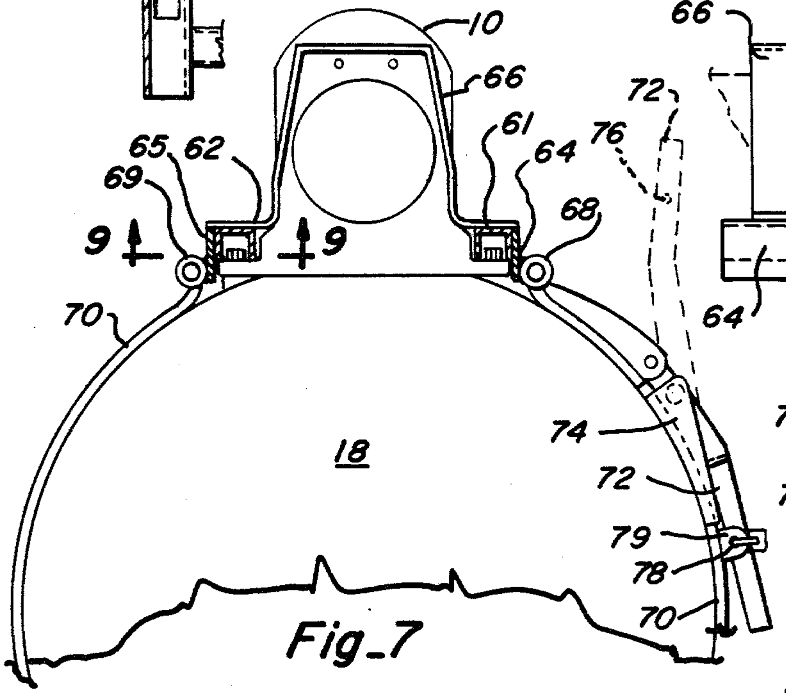
Fig_7
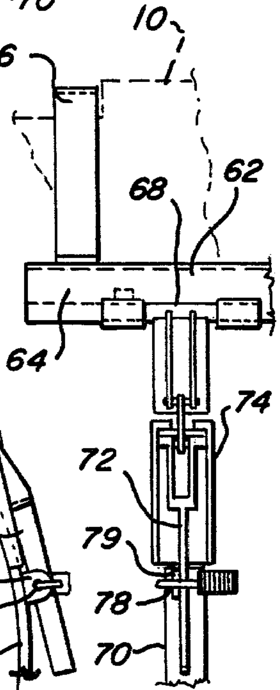
Fig_8

ANTI-THEFT DEVICE

FIELD OF THE INVENTION

The present invention relates to anti-theft devices, and in particular, to the securing of flanged objects such as accessories or components of industrial machines, which are often bolted to surfaces of such machines. In particular, the device covers and prevents unauthorized removal of a valuable object relative to the surface to which it is attached, additionally preventing access to bolts or other attachment devices securing the object to the surface.

BACKGROUND ART AND PRIOR ART STATEMENT

A number of devices have been disclosed for preventing the theft of objects usually attached to, and easily removable from, other equipment by means of bolts or screws. Most of these prior art devices are directed to preventing the theft of communications equipment from vehicles, and accomplish their objective by preventing access to the bolts or attachment means by which the communications equipment is mounted. U.S. Pat. No. 3,410,122 to Moses discloses cover elements which interlock with a mounting bracket to cover the securing means on an object so as to prevent unauthorized removal from the mounting bracket. The Boll patent (U.S. Pat. No. 3,665,739,) provides an anti-theft device for locking an internal combustion engine to a mating transmission. This device is primarily intended for use on a Volkswagon-type vehicle, and involves replacing one of the bolts with the device of the invention which, when the padlock is attached, cannot be removed. U.S. Pat. No. 3,595,041 to Leeper discloses a device comprising hollow side arms for receiving and covering the bolts used to attach communication equipment to a mounting bracket, these arms being locked in place by means of a chain or hinged arms which are secured in tension by means of a padlock. U.S. Pat. No. 3,945,227 to Reiland discloses a hinged bracket surrounding the communications device, the hinged arms are adapted so as to swing into place covering the attachment bolts for the communications device, and being locked into place by means of a padlock. U.S. Pat. No. 4,038,843 to Daley, Jr., discloses another hinged bracket in which hinged portions of the side arms double back upwardly, along the sides of the communications device covering the attachment bolts, and are fastened at their upper end by means of a long bolt running across the top of the communications device.

None of these prior art patents deal with the securing of a flanged object to the surface upon which it is attached, nor are they capable of being adapted to the protection of industrial machinery and equipment.

SUMMARY OF THE INVENTION

In accordance with the present invention, an anti-theft device is provided including a cover assembly comprising cover bars overlying the bolts or other devices by which the flanged object is attached to the adjacent surface, and one or more optional slide obstructor bars connecting the cover bars. The cover bars engage with a securing assembly comprised, in one embodiment, of securing bars which are bolted to the flanged object and to the underlying surface. The same bolts are used in bolting the object and surface together. The cover bars are flanged to cover and prevent access to the bolts, and to allow engagement with the cover assembly. The securing assembly may also include a slide obstructor bar rigidly connecting the securing bars at one end. This slide obstructor may be L-shaped, having a vertical component. After the securing assembly has been mounted, the cover assembly is slid into place, U-shaped flanges on the cover bars slideably engaging with the flanges on the securing bars. There are vertical plates on the front portion of the slide obstructor bar of the sliding cover assembly, one of which contains a padlock hole designed to slide into register with a similar hole on the vertical portion of the securing assembly slide obstructor bar. A padlock is inserted through both holes and locked.

In another embodiment, there is no vertical component either to the obstructor bar on the securing assembly or to the cover assembly, the securing assembly slide obstructor bar lies in the same plane as the securing bars. Instead, padlock holes are drilled in one of the cover bars and one of the securing bars, so that they are in registry when the cover assembly has been slid into place over the securing assembly.

In still another embodiment, the cover bars comprise rectangular tubes or channels, with holes on their undersides to accommodate the heads of the bolts by which the flanged object is attached to the adjacent surface. The cover bars include vertical members extending downward to cover the sides of the flange of the object to be secured, and prevent access to the bolts. Retaining loop(s) extend over and between the cover bars to surround the object to be secured and one or more slide obstructor bars also interconnect the cover bars. This cover assembly can be secured by means of a securing strap attached to the cover assembly, which strap is placed about the circumference of the adjacent object upon which the flanged device is mounted. A toggle device is used to secure the strap and prevent its movement, a padlock being used to lock the toggle device into place and prevent loosening of the strap.

Based on the foregoing description, the present invention meets a number of worthwhile objectives. A cover device is provided to prevent the removal of valuable flanged objects from surfaces to which they are mounted or attached, the device preventing access to the bolts or other devices by which the valuable object is attached to the surface, so as to prevent its unauthorized removal. The device of this invention, when locked into place, prevents the movement of the valuable object relative to the adjacent surface in any direction, so that it cannot be removed without authorization.

BRIEF DESCRIPTION OF THE DRAWINGS

FIG. 5 is a perspective view showing a starting motor attached to an engine protected against theft by the device of this invention;

FIG. 6 shows a second embodiment of the invention protecting the starting motor of FIG. 5;

FIG. 7 is a cross sectional view taken along lines 7—7 of FIG. 6;

FIG. 8 is a partial side view of the invention showing the securing strap; and

FIG. 9 is a partial sectional view taken along the lines 9—9 of FIG. 8.

DESCRIPTION OF THE PREFERRED EMBODIMENT

Figure 1:
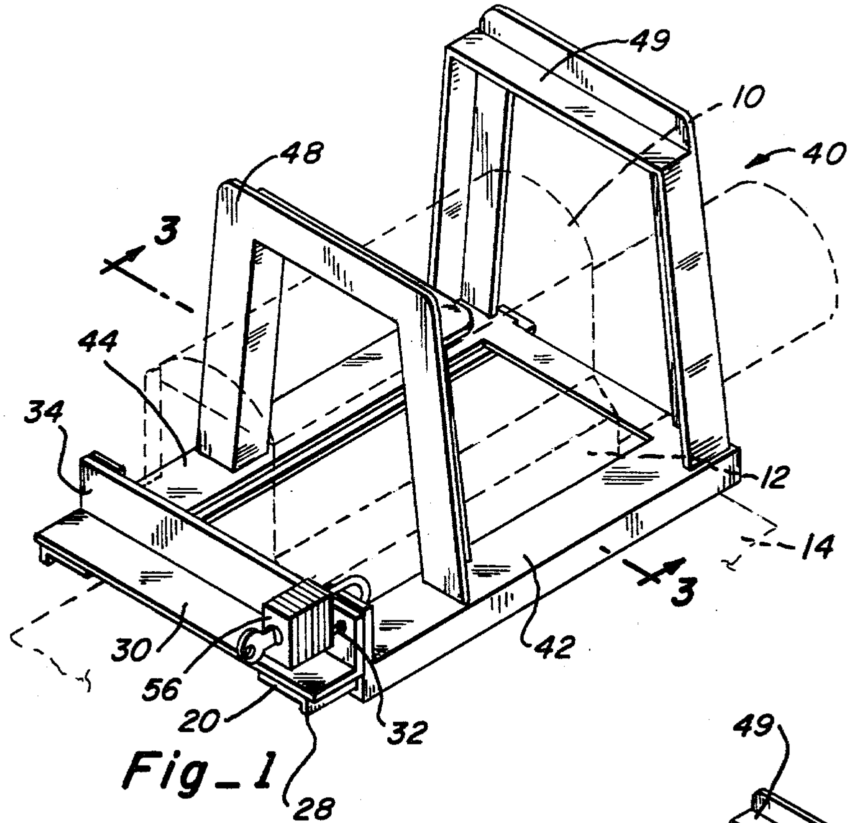
FIG. 1 is a perspective view of the anti-theft device of the present invention shown locked in place over the object to be protected.
Figure 2:
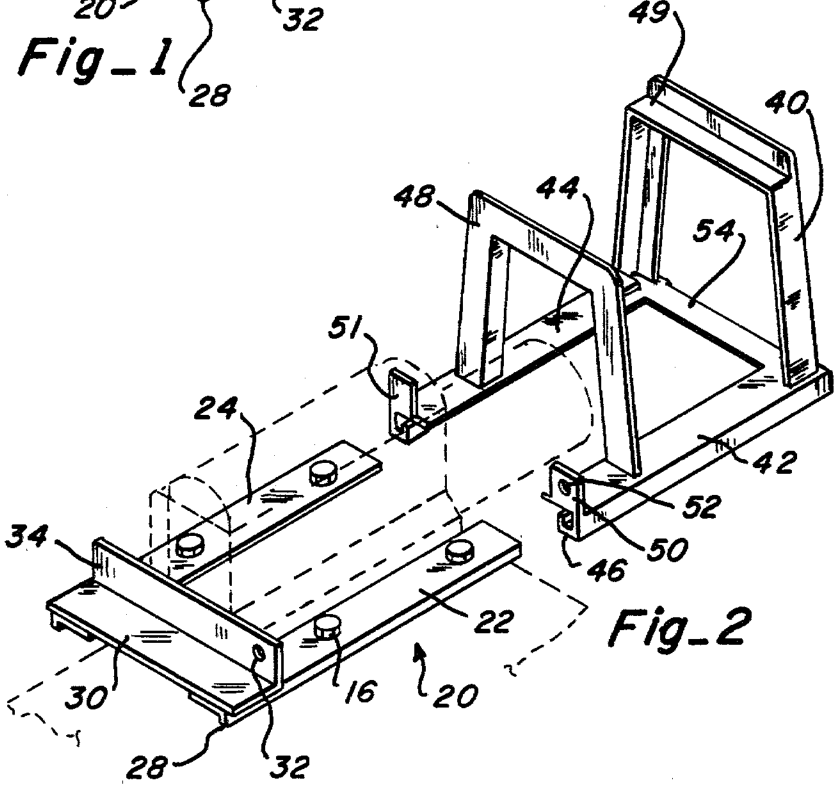
FIG. 2 is a perspective view with the cover assembly slid back.
Figure 3:
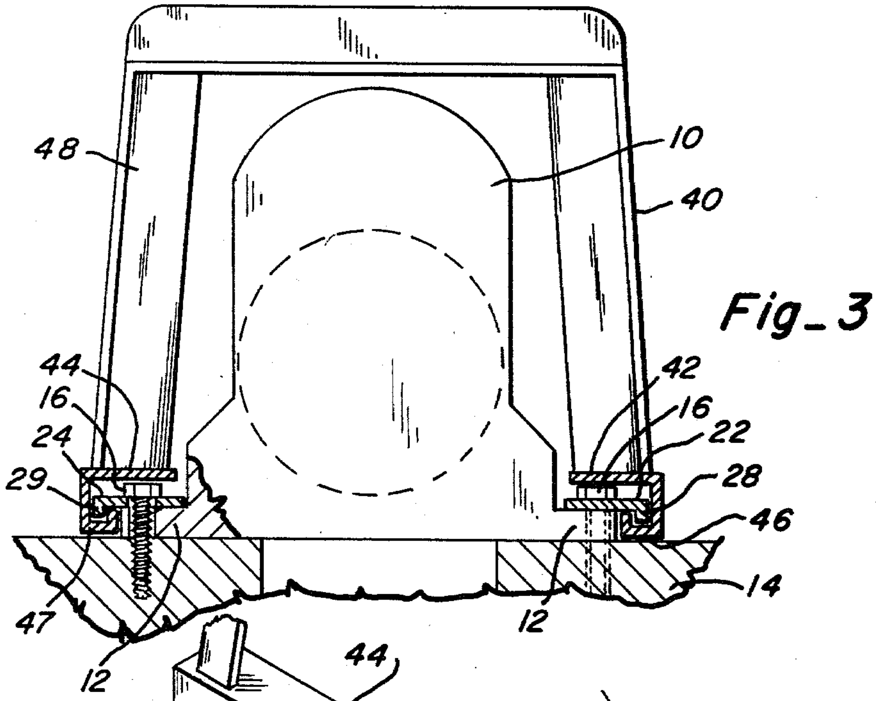
FIG. 3 is a cross-section view taken along lines 3—3 of FIG. 1.

In accordance with this invention, a valuable object 10, such as a starter motor, generator or battery, having a flanged base 12 adjacent to the mounting surface 14 of a second object 18, as best seen in FIG. 5, is secured to said surface by means of a securing assembly 20. The securing assembly 20 comprises a first securing bar 22 positioned overlying one side or portion of the flange 12, and a second securing bar 24, overlying the flange 12 on the opposite side of the object 10. The securing bars have bolt holes or slots 26, spaced so as to accommodate the bolts 16 by which the object 10 is secured to the surface 14. The securing bars 22, 24 have vertical flanges 28, 29 respectively, along their outer edges extending downward almost to the surface 14 to prevent access to the bolts 16. The securing assembly may have a first slide obstructor bar 30 connecting the securing bars, and preventing the assembly from sliding past the valuable object 10 in one direction. The slide obstructor bar may have a vertical component 34 designed to abut a vertical component of the cover assembly as will be pointed out hereafter. The slide obstructor bar 30 includes a hole 32 to accomodate a padlock or other locking means, and placed so as to be in registry with a similar hole on the cover assembly as hereinafter described.

The invention also includes a cover assembly 40 comprised of a first cover bar 42 adapted to overlie flange 12 and first securing bar 22, and a second cover bar 44 spaced apart from the first cover bar and adapted to overlie the other side of flange 12 and second securing bar 24. The cover bars are equipped with U-shaped flanges 46, 47 extending vertically from their outer edges, forming a channel to accommodate flanges 28, 29, respectively, of the securing bars, so that the cover assembly may be slid into place on the securing bars. The cover assembly is also equipped with retaining loop or loops 48, 49 the ends being joined to the first and second cover bars, 42 and 44, respectively. The looped portions are adapted to extend over the object 10. In addition, at the anterior end of the cover assembly, this being the leading end when the cover assembly is slid into place on the securing assembly, there may be vertical upright member(s) 50, 51 designed to abut with the vertical portion 34 of the first slide obstructor bar when the cover assembly is in place on the securing assembly. One of these upright members 50 includes a padlock hole 52 designed to be in registry with padlock hole 32 in the upright members 34 when the device is assembled, and through which padlock 56 is placed. In addition, the cover assembly may be equipped at its posterior end with a second slide obstructor bar 54, if desired, to prevent forward movement of the cover assembly relative to the object 10.

In another embodiment of this invention, as best seen in FIG. 6, a modified cover assembly 60 comprises a first and second cover bar, 61 and 62, in the form of a rectangular channels, the bottoms of which are formed with bolt holes 63 to accommodate the heads of the bolts 16 attaching the object 10 to the surface, so that the heads extend up into the space inside the channels of the cover bars 61 and 62, and access to the bolts is prevented. A slide obstructor bar 66 connects the modified cover bars and prevents movement of the modified cover assembly past the object to be protected. Each cover bar is equipped with a vertical flange 64, 65, respectively, on its outer edge extending vertically downward to surface 14, to prevent access to bolts 16 from the sides. Flanges 64, 65 are equipped with hinged attachments 68, 69 for securing strap 70 which extends around the outer perimeter of second object 18 to which the valuable object 10 is attached. Strap 40 is equipped with tightening means such as a toggle mechanism comprising toggle lever 72 and toggle engagement 74, adapted so that when the toggle lever 72 is in its closed position, no slack remains in strap 70, and relative movement of object 10 with respect to second object 18 is prevented. The toggle lever 72 has a padlock hole 76 designed to be in registry with a padlock hole 78 in lock flange 79 in the closed position, so that padlock 56 may be secured therethrough to prevent removal of strap 70. It is to be understood that the embodiment shown in FIG. 6 with the addition of a cross bar across the open legs of cover bar 61, 62 is useful not only in connection with objects secured to surfaces by means of bolts, but also by other attaching means, as well as those which merely rest upon or abut against adjacent surfaces of another object.

Figure 4:
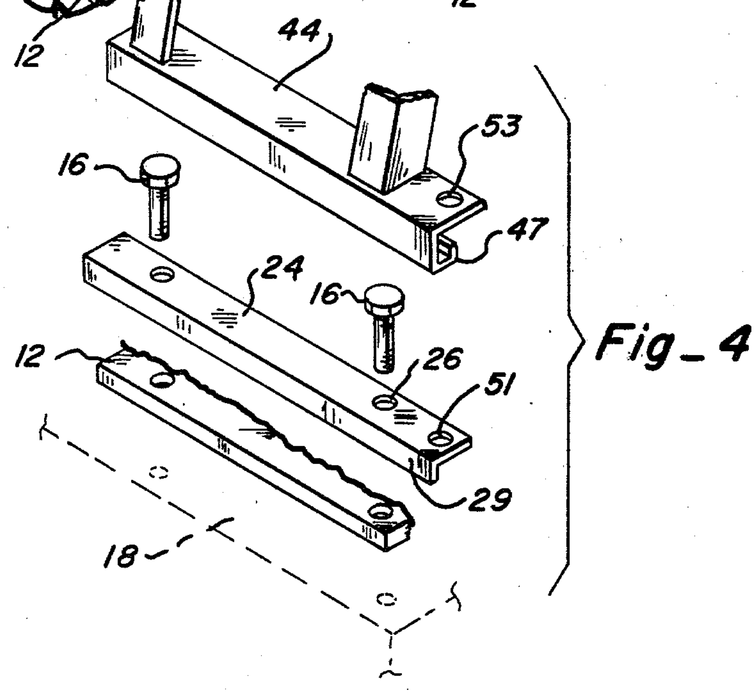
FIG. 4 is an exploded view showing the flange cover and securing bars.

Another embodiment of the invention is shown in FIG. 4. A padlock hole 51 may be positioned in the end of securing bar 24 so as to be in registry with a second padlock hole 53 in cover bar 44 when the anti-theft device is assembled. It should also be evident that securing flange 29, U-shaped engaging flange 47 and flange 12 on the object to be protected must all be of a height compatible with each other.

The anti-theft device of this invention prevents access to the attachment means by which a valuable object is attached to an adjacent surface and/or obstructs relative movement of the valuable object with respect to the surface against which it rests, thereby preventing the unauthorized removal of the object without a key or combination to the locking means.

It is apparent that various modifications and changes can be made, e.g. in size, shape and materials of construction, in order to accommodate the sizes and shapes of the objects to be secured and surfaces to which they are to be secured, without departing from the spirit and scope of the invention.

What is claimed is:

1. An anti-theft device for preventing removal of a flanged object mounted on an adjacent surface by attachment means, said device comprising:

a securing assembly including at least two securing bars overlying the flanged portion on each side of said object and attached to said adjacent surface by the same attachment means used for the flanged object;

a cover assembly comprising at least two cover bars overlying said securing bars and preventing access to said attachment means, said cover bars are joined by at least one retaining loop fitting over said flanged object, said securing and cover assemblies having means to make them slideably engageable wherein said securing bars further are connected by a slide obstructor bar to prevent sliding of said cover assembly past said flanged object; and locking means by which said securing assembly is locked to said cover assembly.

2. The device of claim 1 wherein said attachment means are bolts.

3. The device of claim 1 wherein said cover bars are connected by a second slide obstructor bar adapted to be positioned opposite the first slide obstructor bar when the cover assembly is in place.

4. The device of claim 3 wherein said first slide obstructor bar has a vertical component adapted to abut an opposing vertical component on at least one of said cover bars, at least two of the abutting components having aligned holes arranged to receive the locking means.

5. An anti-theft device for preventing removal of a flanged object from an adjacent surface comprising:

a securing assembly including first and second securing bars overlying the flanged portions of said flanged object at opposite sides of said flanged object, said securing bars being equipped at their outer edges with flanges extending toward said surface, the peripheral edges of which are adapted to fit into a channel of a cover assembly, said securing bars being provided with bolt holes spaced so as to accommodate bolts through each flange by which said flanged object is attached to said surface, said first and second securing bars being connected to a slide obstructor bar to prevent sliding of said securing assembly relative to said flanged object in more than one direction, said slide obstructor bar having a vertical component;

a cover assembly including first and second cover bars overlying said first and second securing bars and preventing access to said bolts, said cover bars being joined by a retaining loop fitting over said flanged object, and a second slide obstructor bar adapted to be positioned opposite the first slide obstructor bar when the cover assembly is in place, said cover bars being equipped at their outer edges with vertical U-shaped flanges forming channels adapted to accommodate the flanges of said securing bars, said second slide obstructor bar being further equipped with at least one upright member positioned to abut the vertical portion of said first slide obstructor bar when the cover assembly is slid into place on the securing assembly, said upright member having a hole therein designed to be in registry with a hole in the vertical portion of the first slide obstructor bar when the cover assembly is slid into place; and a locking means positioned through said holes to lock both assemblies into place.

* * * * *